United States Patent [19]
Jefferson

[11] 4,208,025
[45] Jun. 17, 1980

[54] ROTARY WING AIRCRAFT

[76] Inventor: Raymond Jefferson, 71 Stirtingale Rd., Bath BA2 2NG, Somerset, England

[21] Appl. No.: 941,802

[22] Filed: Sep. 11, 1978

[51] Int. Cl.² .............................................. B64C 29/00
[52] U.S. Cl. .................................. 244/12.2; 244/23 C
[58] Field of Search ..................... 244/12.2, 12.3, 12.5, 244/23 C, 23 A, 23 B, 23 D, 130

[56] References Cited
U.S. PATENT DOCUMENTS

| | | | |
|---|---|---|---|
| 2,863,621 | 12/1958 | Davis | 244/23 C |
| 3,599,902 | 8/1971 | Thomley | 244/12.2 |
| 3,693,913 | 9/1972 | Barland et al. | 244/130 |
| 3,813,059 | 5/1974 | Jefferson | 244/12.2 |

FOREIGN PATENT DOCUMENTS

| | | | |
|---|---|---|---|
| 1288924 | 2/1969 | Fed. Rep. of Germany | 244/23 C |
| 1347733 | 11/1963 | France | 244/23 C |

*Primary Examiner*—Charles E. Frankfort
*Attorney, Agent, or Firm*—Mason, Fenwick & Lawrence

[57] ABSTRACT

An aircraft rotary wing aerofoil assembly comprising a generally planar annular frame supporting radially inner and outer sets of aerofoil blades, each set being disposed to form an annulus and supported on the frame for rotation about a common axis, and first and second sets of panels are mounted on the frame for movement to shroud portions of the inner and outer sets of aerofoil blades respectively.

8 Claims, 5 Drawing Figures

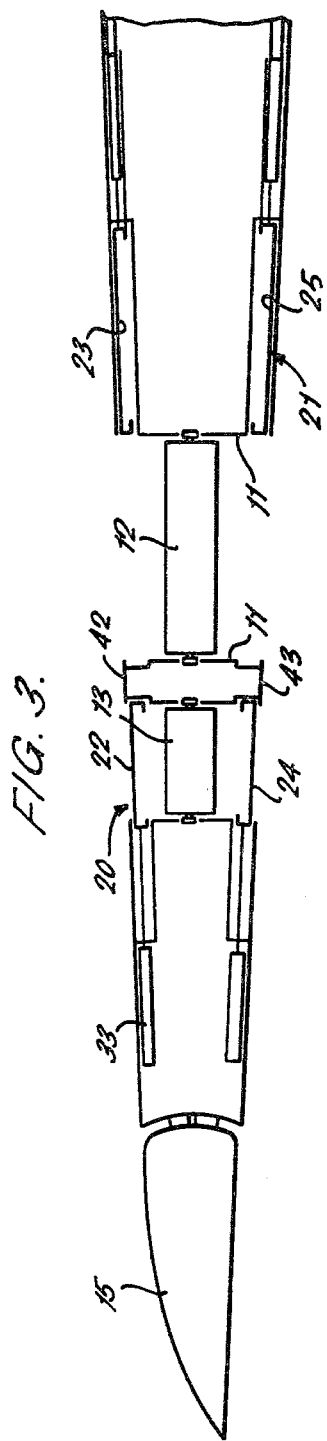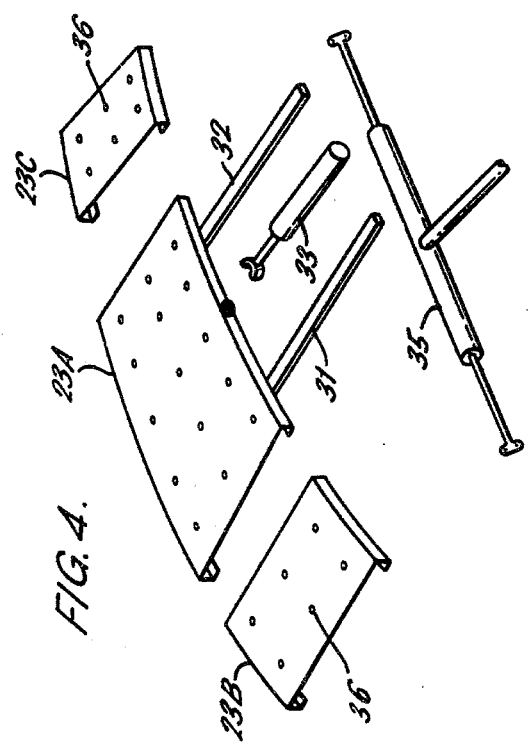

ROTARY WING AIRCRAFT

This invention relates to a rotary wing aerofoil assembly and to an aircraft incorporating such an assembly.

According to the present invention there is provided a rotary wing aerofoil assembly for an aircraft, said assembly comprising a generally-planar annular frame supporting radially inner and outer sets of aerofoil blades, said sets each being disposed to form an annulus and being supported on said frame for rotation about a common axis, and first and second sets of panels mounted on said frame and movable respectively to shroud portions of said inner and outer sets of aerofoil blades.

An embodiment of the present invention will now be described by way of example with reference to the accompanying drawings, in which:

FIG. 3 is a diagrammatic view of part of the assembly of FIG. 2 shown to a larger scale;

FIG. 4 is an exploded view of a detail of FIG. 3; and

Figure 1:
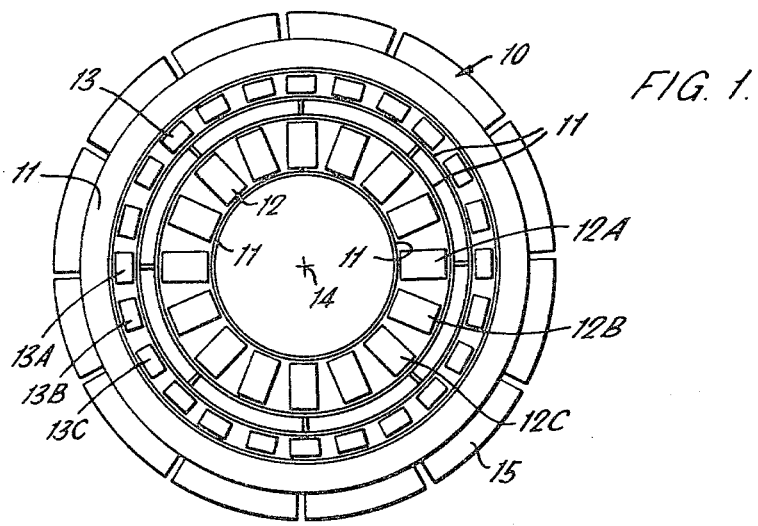
FIG. 1 is a plan view of a known aerofoil assembly.

The aerofoil assembly 10 which is illustrated in FIG. 1 comprises a frame 11 which has various annular components supporting concentric inner and outers sets 12, 13 of aerofoil blades 12A, 12B, etc., 13A, 13B etc., which are rotatable relative to the frame 11 about a central axis 14 by means not shown. The sets 12, 13 are contra-rotatable and this may be achieved by independent drives connected to the respective sets of blades 12, 13 or by a single drive connected to one of the sets 12, 13 and a drive connection between the two blade sets 12, 13. Control flaps 15 are hingeably mounted around the outer periphery of the frame 11 in order to control flight direction.

Figure 2:
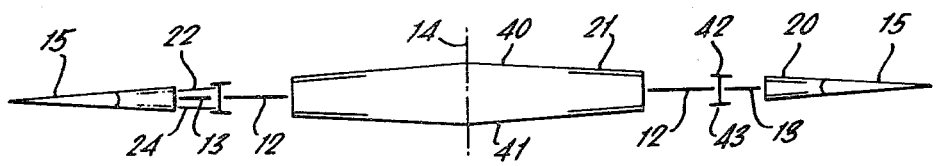
FIG. 2 is a diagrammatic sectional view of the assembly according to the present invention.

In the assembly of FIG. 1 each of the blades in each of the sets 12, 13 is exposed to free air when the assembly is in operation. This imposes limitations upon the performance of the assembly which I have discovered can be overcome or mitigated by the provision of two sets of panels 20, 21 which can be moved to shroud the blade sets 12, 13 at least for a portion of their annular movement. As is depicted in FIGS. 2 and 3 these panel sets 20, 21 each include an upper plurality of members 22, 23 and a lower plurality of members 24, 25 respectively. In the set 20 the members 22, 24 are movable from a housed position illustrated in phantom to a shrouding position which is illustrated in full in FIG. 2. The housed position is located externally of the peripheral outline of the outer set of aerofoil blades 13. Likewise the panel set 21 has its members 23, 25 movable into and out of a housed position which is peripherally surrounded by the inner set of aerofoil blades 12. The upper plurality of members 23 may conveniently take the form depicted in FIG. 4. A first member 23A is mounted on arms 31, 32 and is movable from the housed position by a hydraulic ram 33. Carried within the member 23A and slidable relative thereto are members 23B and 23C, the sliding movements being effected by a double ended hydraulic ram 35 the cylinder of which is secured to the member 23A. With this arrangement member 23A could be moved to shroud the inner set of aerofoil blades 12 by forming part of an annular tunnel through which the blades 12A, 12B etc., move, the opposed face of the tunnel having been formed in like manner by movement of the corresponding member 25A of the lower plurality of panel members, thereafter either or both of the members 23B and 23C could be telescopically extended by the ram 35, corresponding movement taking place with the members 25B and 25C.

In another arrangement the members 23A, 23B etc., of the upper plurality of panel members are telescopically mounted one within the other and are movable only in an annular path. The members 25A, 25B etc., of the lower set of panel members would be similarly arranged as would the members of the other set of panels 20. In a still further arrangement the panel members may be pivotted at one corner and movable to shroud aerofoils, the panels members, overlapping as necessary in both the housed and the shrouding positions.

In addition to the provision of sets of panels 20, 21 the illustrated embodiment incorporates streamlining covers 40, 41, 42, 43 secured to the frame 11, the covers 40, 41 enclosing the central area of the assembly 10 within which an aircraft fuselage and drive gear may be mounted. The covers 42, 43 enclose the region between the inner and outer sets of aerofoil blades 12, 13 and in this way permit a fully streamlined assembly to be achieved.

Figure 5:
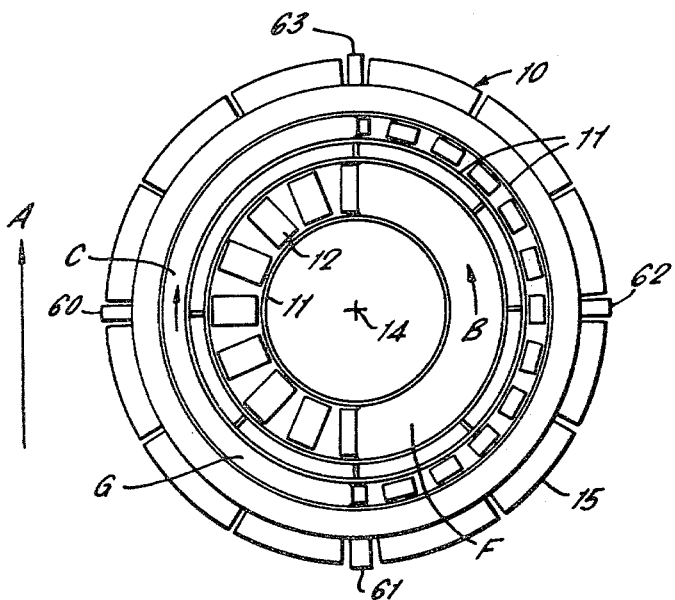
FIG. 5 is a plan view of an aircraft incorporating the assembly of FIG. 2.

The assembly described with reference to FIGS. 2 to 4 when provided with a central fuselage and control and drive means forms an aircraft which is capable of operation at subsonic (up to about mach.0.7) speeds, transonic speeds (between mach 0.7 and mach 1.2) and supersonic speeds (above mach 1.2) including hypersonic speeds (above mach 5.0). At subsonic speeds the panels of the assembly will normally be in their housed position so that substantially the entirety of the sets of aerofoil blades is exposed to free air flow. As the aircraft advances, because the aerofoil blade sets are rotating, the blades pass through an "advancing" condition once each revolution during which the blades move relative to the surrounding atmosphere at a speed which is equal to the speed of the aircraft plus the component of rotational velocity. In this way as speed increases transonic speeds may be attained by the aerofoil blades resulting in compressibility of the air which is incident on such blades. This would normally be a limiting factor in the speed of advance or blade rotation but by virtue of the provision of the panels of the present invention the blades can be covered or shrouded during their advancing condition. In order to maintain or even increase the speed of advance of the aircraft the rotational speed of the blade sets requires to be increased but no problem arises even when the aircraft speed reaches supersonic. This is illustrated in FIG. 5 where the aircraft flight direction is indicated by arrow A, the inner set of aerofoil blades rotate as indicated by arrow B, and the outer set of aerofoil blades rotate as indicated by arrow C. The panels 21 shroud the portion F of the inner set of blades 12 and the panels 20 shroud the portion G of the outer set of blades 13. For the purpose of achieving guidance control in a rarefied atmosphere the aircraft includes rockets or jets 60, 61, 62, 63 equispaced around the outer periphery of the frame 11. Hypersonic speeds may be achieved more readily by controlling the lateral control flaps 15 to maintain a near vertical depending position in order to ride the shock wave which forms under the craft.

When the aircraft of FIG. 5 is airborne it may be subjected to sudden gusts of wind which temporarily unbalance the aircraft. The panels of the present embodiment can be utilised in such a situation to control the lateral and longitudinal stability of the aircraft. For example, if one part of the aerofoil assembly dips the diametrically opposed portion of the aerofoil assembly may be shrouded to equalise the lift effort and the speed of rotation of the aerofoil blade sets may be increased.

The panel sets 20, 21 may conveniently have members with a surface curvature to match that of the remainder of the outer surface of the assembly or the streamlining covers 40, 41, 42 and 43 when the latter are present. Additionally to promote smooth airflow over the surface of each of the panel members the surfaces may incorporate a large number of apertures 36 such as depicted in FIG. 4.

It will also be appreciated that the sets of panels conveniently may be utilised completely to shroud the sets of aerofoil blades when the aircraft of FIG. 5 or even the aerofoil assembly of FIG. 2 is at rest on the ground. If the sets of panels completely shroud the sets of aerofoil blades when the aircraft is airborne it is transformed into a glider.

Furthermore, in the event that the panel members are formed from a heat reflecting or shielding material they may be used to protect the aerofoil blades from the effect of small meteors and extreme temperatures.

In a further modified version permanently fixed panels are provided for shrouding portions of F and G in FIG. 5, the remaining portions of F and G being selectively shroudable by means of the movable panels discussed above.

What is claimed is:

1. A rotary wing aircraft including a generally planar annular frame supporting radially inner and outer sets of aerofoil blades, said sets each being disposed to form an annulus and being supported on said frame for rotation in opposite directions about a common axis, first and second sets of panels movably mounted on said frame, the first and second sets of panels being selectively movable to cover the inner and outer sets of airfoil blades during only the advancing portions of their paths of travel to prevent transonic airflow over the sets of blades in the advancing portions of their paths of travel during high speed flight.

2. The aircraft as claimed in claim 1, wherein each said set of panels incorporates a plurality of upper members and a plurality of lower members between which an intermediate space is provided and said inner and outer sets of aerofoil blades are respectively located in the intermediate space between the upper and lower members of the first and second sets of panels when the latter are positioned to shroud portions of said sets of aerofoil blades.

3. The aircraft as claimed in claim 2, wherein the members of the first set of panels are each radially movable between a housed position wherein said members are located within and peripherally surrounded by the inner set of aerofoil blades, and a shrouding position wherein one or more of the opposed upper and lower members form part of an annular tunnel through which the inner set of aerofoil blades is movable.

4. The aircraft as claimed in claim 2, wherein the members of the second set of panels are each radially movable between a housed position wherein said members are located externally of the periphery of the outer set of aerofoil blades, and a shrouding position wherein one or more of the opposed upper and lower members form part of an annular tunnel through which the outer set of aerofoil blades is movable.

5. The aircraft as claimed in claim 2, wherein the upper and lower members of each set of panels are respectively telescopically mounted relative to each other and movable on said frame in annular paths to shroud said sets of aerofoil blades.

6. The aircraft as claimed in claim 2 wherein the members of each set of panels incorporate a large number of apertures to promote smooth airflow over the surface thereof.

7. The aircraft of claim 1, in which the sets of panels are additionally selectively movable to provide lateral and longitudinal control.

8. The aircraft as claimed in any of claims 1, 7, 2, 3, 4 or 5 including covers secured to the frame in a central portion radially within the inner set of aerofoil blades, and in an annular portion outwardly of the outer set of aerofoil blades.

* * * * *